United States Patent [19]

LeMense et al.

[11] Patent Number: 5,568,120
[45] Date of Patent: Oct. 22, 1996

[54] ANTI-THEFT SYSTEM WITH REMOTE CONTROLLED VERIFICATION OF ARMING

[75] Inventors: Thomas J. LeMense, Livonia; David R. Tengler, West Bloomfield, both of Mich.

[73] Assignee: Ford Motor Company, Dearborn, Mich.

[21] Appl. No.: 350,296

[22] Filed: Dec. 6, 1994

[51] Int. Cl.⁶ .................................................. B60R 25/10
[52] U.S. Cl. .................. 340/426; 340/425.5; 340/539; 180/287; 307/10.2
[58] Field of Search ................................. 340/426, 425.5, 340/430, 539, 825.69, 825.72; 361/172; 307/10.2; 180/287

[56] References Cited

U.S. PATENT DOCUMENTS

| | | | |
|---|---|---|---|
| 4,383,242 | 5/1983 | Sassover et al. | 340/426 |
| 4,884,055 | 11/1989 | Memmola | 340/426 |
| 4,887,064 | 12/1989 | Drori et al. | 340/426 |
| 5,113,182 | 5/1992 | Suman et al. | 340/825.31 |
| 5,307,048 | 4/1994 | Sonders | 340/426 |
| 5,381,128 | 1/1995 | Kaplan | 340/426 |

OTHER PUBLICATIONS

"Remote Plus" Alarm System Operating Instructions, 1991 Model Year.
1993 Mark VIII Service Manual, Section 01–14B Keyless Entry System, pp. 01–14B–1 through 01–14B–9.
1994 Probe Service Manual, Section 13–11 Anti–Theft Alarm System, pp. 13–11–1 through 13–11–3.

*Primary Examiner*—Jeffery Hofsass
*Assistant Examiner*—Julie B. Lieu
*Attorney, Agent, or Firm*—Mark Mollon

[57] ABSTRACT

A remote controlled anti-theft system for transportation vehicles allows the user to easily determine at will if a faulty door position sensor or an open door will inhibit proper operation of the anti-theft system by pressing the lock button on the remote transmitter in a predetermined sequence. A first lock code from the remote transmitter initiates a locking and arming sequence of the anti-theft system. A second lock code received within a predetermined time of the first lock code causes an audible verification to be produced identifying whether the anti-theft system is successfully arming or whether a door ajar or faulty door sensor is preventing the anti-theft system from arming.

4 Claims, 2 Drawing Sheets

ANTI-THEFT SYSTEM WITH REMOTE CONTROLLED VERIFICATION OF ARMING

BACKGROUND OF THE INVENTION

The present invention relates in general to remote controlled anti-theft systems for vehicles, and more specifically to providing audible horn chirps or beeps (and/or visible flashes of exterior lights) identifying successful or unsuccessful remote controlled operation of the anti-theft system.

Remote entry systems are known for cars, trucks, and other transportation vehicles which operate locks, anti-theft systems and vehicle personality features such as seat and mirror position. A remote entry radio receiver is mounted in the vehicle which responds to a radio transmitter carried by the user of the vehicle. In one common type of system, the user depresses a control button on the remote transmitter causing a coded signal to be transmitted to the receiver identifying a command desired by the user, e.g. lock or unlock doors, unlock trunk, or arm, disarm or trigger an anti-theft system. Unique portions of the codes identify the individual transmitter to insure that only an authorized user gains access to the vehicle or the remote entry functions.

Anti-theft systems provide perimeter protection by sensing unauthorized entry into a vehicle and then initiating a siren or other action to deter entry. When in its armed or active state, the anti-theft system monitors sensors, such as door position sensors, to detect entry. Other types of sensors include vibration sensors, glass breakage sensors, hood position switches, and trunk tamper switches, for example. The authorized user causes the anti-theft system to enter its armed state when leaving the vehicle and disarms the anti-theft system upon returning and prior to entering the vehicle.

When arming the anti-theft system, the user may desire verification of proper arming to ensure that the anti-theft system will be effective during his absence. Such verification typically takes the form of audible beeps or horn chirps that signify successful arming. Verification may also take the form of flashing the vehicle exterior lights with or without the use of audible chirps. Any combination of the headlamps and parking lights can be flashed.

These verification actions from the vehicle to signify successful arming of the anti-theft system may be undesirable in certain situations. Horn chirps and headlight flashes may be especially disturbing in a quiet residential neighborhood late at night.

Prior art anti-theft systems have thus been given the ability to optionally either provide or not provide verification of arming. This selection is made by a setting switch on the anti-theft module in the vehicle for the desired mode of operation, i.e., verification mode or non-verification mode. Once a system is preset, however, the single chosen mode of operation is utilized at each arming, independent of the time of day or situation. Thus, the user does not have the option of obtaining verification of system arming with horn chirps at loud places during the day and then not obtaining verification in quiet settings late at night.

SUMMARY OF THE INVENTION

The present invention provides the advantage that the anti-theft system user can obtain on-demand verification as desired.

The present invention provides a remote controlled anti-theft system for a transportation vehicle providing on-demand audible verification of anti-theft system operation comprising a portable transmitter which transmits a lock code in response to a manual activation. Door lock actuators will lock the doors of the transportation vehicle in response to a lock command signal that may be generated following reception of a lock code if it is received with a valid user code. Door position sensors associated with the doors each generate a respective door-closed signal when its respective one of the doors is closed. A sound transducer, such as a car horn, produces an audible sound output in response to an energizing signal. A vehicle-mounted control module responds to a first occurrence of the lock code to (1) generate the lock command signal which is sent to the door lock actuators, and (2) enter an armed state if each of the door position sensors produces a door closed signal. The control module is further responsive to a second occurrence of the lock code received within a predetermined time of the first occurrence of the lock code to generate a first energizing signal to produce a first audible sound output if the lock command has been sent and each of the door position sensors produces a door-closed signal, or to generate a second energizing signal to produce a second audible sound output if at least one of the door position sensors fails to produce a door-closed signal. The control module does not produce any energizing signal absent the second occurrence of the lock code.

DETAILED DESCRIPTION OF PREFERRED EMBODIMENTS

Figure 1:
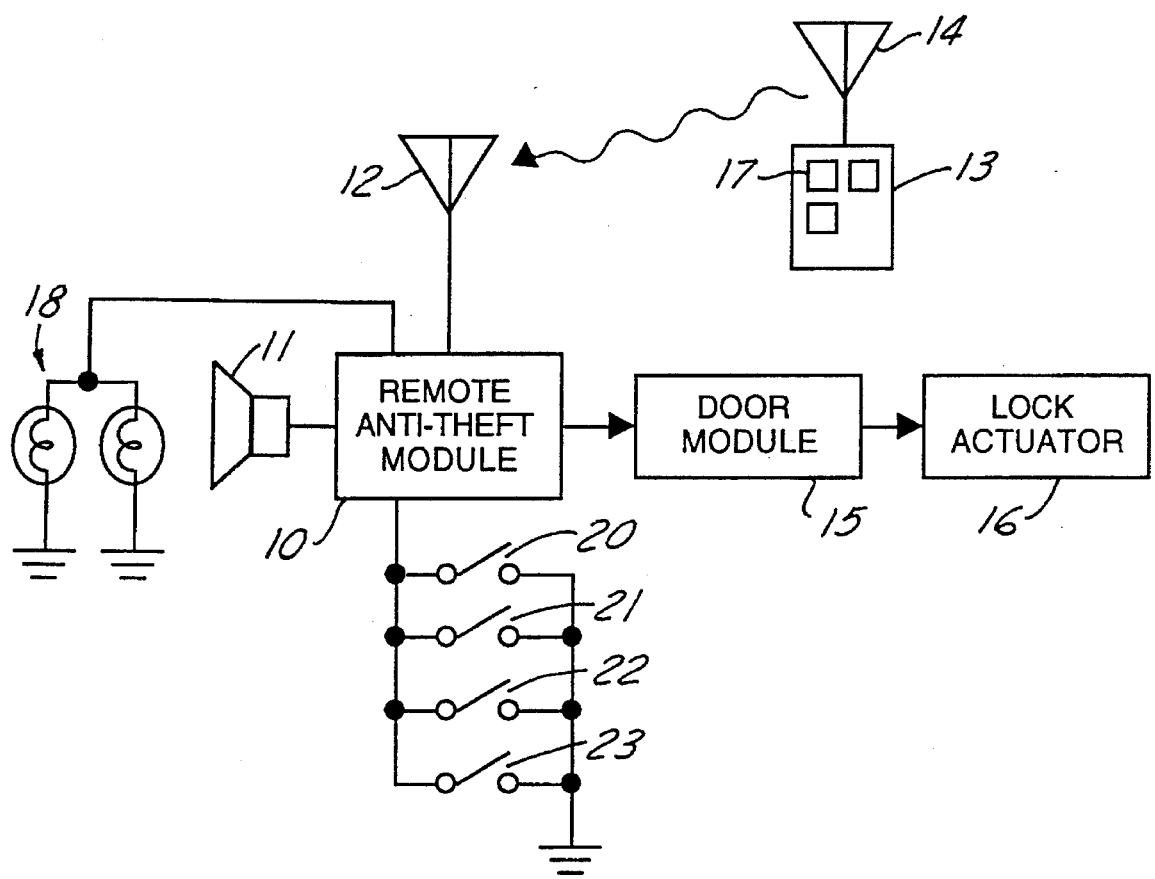
FIG. 1 is a schematic block diagram of an anti-theft system according to the present invention.

Referring to FIG. 1, a vehicle-mounted remote anti-theft module 10 contains electronics for performing remote entry and anti-theft functions as are well known in the art. A speaker or car horn 11 is connected to module 10 to receive an energizing signal for producing beeps or horn chirps as are described below. Likewise, exterior lamps 18 are coupled to module 10 for producing visible flashes under control of module 10. Module 10 is connected to an antenna 12 for communicating with a remote transmitter 13 having its own internal antenna 14. Module 10 is further connected to a door module 15 and provides lock and unlock command signals to door module 15. In turn, door module 15 actually locks or unlocks an appropriate vehicle door via a respective lock actuator 16.

Remote transmitter 13 includes a plurality of push buttons including a lock push button 17. When lock push button 17 is manually activated, a coded signal is sent from remote transmitter 13 through a radio frequency signal to module 10, which recognizes the coded signal and locks vehicle doors via a lock command signal to door module 15. Preferably, upon locking of the vehicle doors, module 10 enters an anti-theft mode and attempts to arm the anti-theft system.

The RF signal transmitted from remote transmitter 13 includes at least two data segments, namely a user code that will identify whether the transmitter is authorized for vehicle entry and a function code (e.g., the lock code) identifying which push button was pressed.

Perimeter protection is provided by a plurality of door position sensors comprised of door switches 20–23, each associated with a respective vehicle door. When authorized remote transmitter 13 transmits a lock code in response to depressing lock button 17, remote anti-theft module 10 locks the vehicle doors and then enters a pre-arm state in which a ready-to-arm indicator light on the vehicle instrument panel is illuminated and the opened/closed status of the vehicle doors are checked. Thus, door position sensors 20–23 are checked to determine whether all the doors are closed, and if not all doors are closed then module 10 waits in the pre-armed state until they are all closed. Once all doors are closed, a predetermined exit delay, e.g., 30 seconds, is begun. The exit delay is necessary since the door lock command may have been initiated from within the vehicle and time may be needed to allow the occupants to leave the vehicle. After this exit delay, the system becomes fully armed and any change in condition of a door position sensor from a door-closed signal to a door-opened signal results in a siren signal from horn 11.

The present invention provides on-demand audible and/or visual verification of anti-theft system operation as follows. Such audible or visible verification is initiated using a unique button sequence on remote transmitter 13, but no audible or visible verification is provided without such a specific request by the user. In a preferred embodiment, the unique button sequence is comprised of a second occurrence of a transmission of the lock code from the portable transmitter within a predetermined time of the first transmission of the lock code which initiated locking of the vehicle doors. The predetermined time may be about five seconds. Thus, if a second lock code is received within five seconds of the initial lock code, an audible verification is made to identify the state of the anti-theft system, i.e., whether the anti-theft system is successfully entering an armed state. The ability to enter an armed state depends upon the closing of all perimeter doors as indicated by door position sensors 20–23. One distinctive audible sound indicates that all doors are closed and that arming of the anti-theft system is successful, and a second audible sound, different from the first, indicates an open door and unsuccessful arming of the anti-theft system. In a preferred embodiment, a single horn chirp indicates that the anti-theft system is arming while a double horn chirp indicates an inability to arm. Anti-theft module 10 provides an energizing signal to transducer 11 to produce the chirps. A chirp preferably is obtained by sounding transducer 11 for about 1/20th of a second at the normal operating frequency of the horn. The double chirp comprises two successive 1/20th of a second horn chirps separated by about 1/3rd of a second. Thus, a first energizing signal from module 10 for producing the first audible sound is comprised of an alternating voltage signal with a duration of 1/20th of a second. The second energizing signal is comprised to two successive alternating voltage signals, each with a duration of 1/20th of a second. If visible flashes are given for verification, then similar times are used for flash duration and separation.

Figure 2:
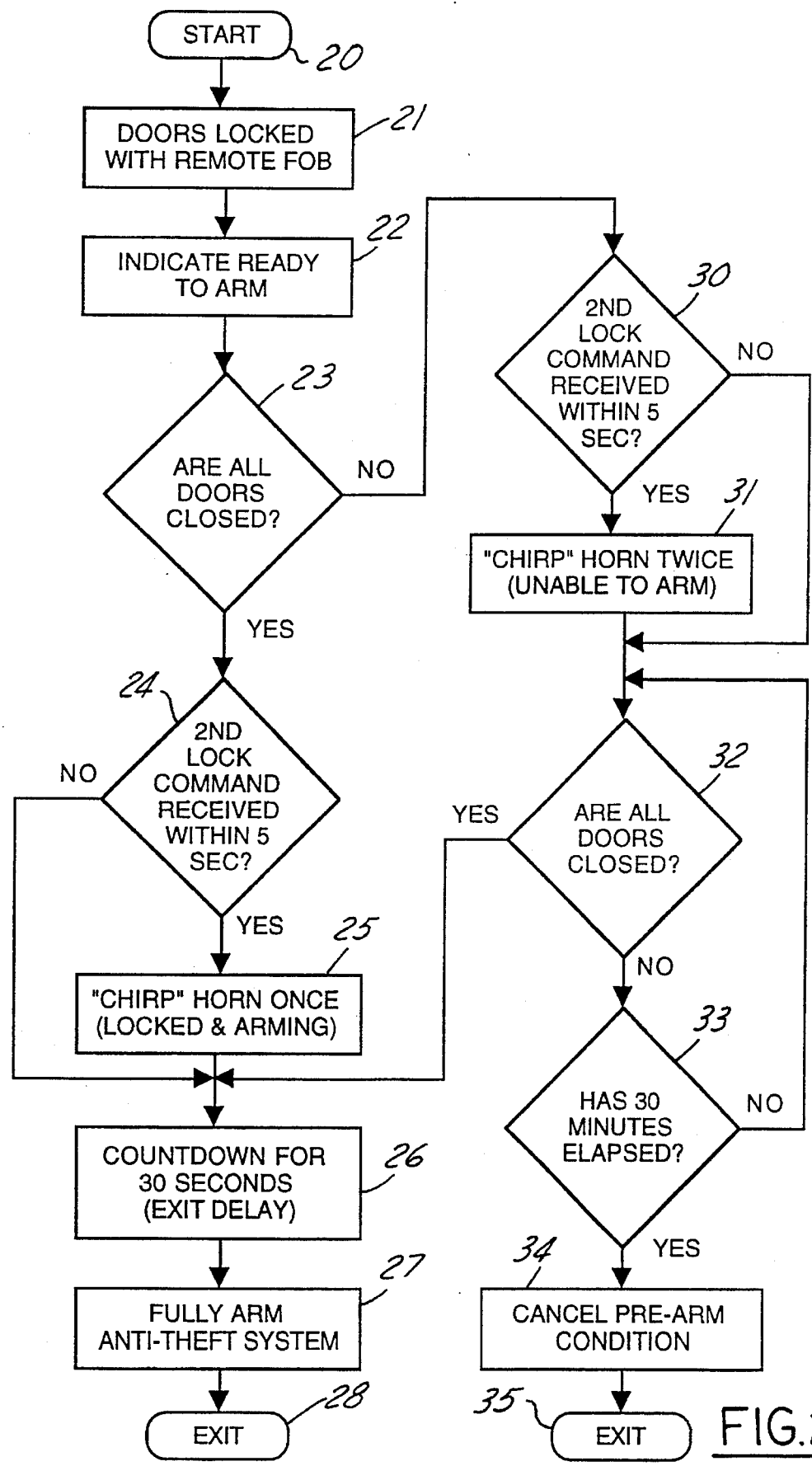
FIG. 2 is a flow chart showing operation of the anti-theft system of the present invention.

The sequence of operation of the present invention is shown in greater detail in the flow chart of FIG. 2. The flow chart illustrates a preferred subroutine to be implemented in a microprocessor contained within anti-theft module 10 and begins at a start block 20. In step 21, a first lock code is received from the remote transmitter after manual activation by the user of a lock push button. The doors are locked and a timer is initiated to distinguish a second lock code transmitted within a predetermined time of the first lock code. After the lock commands are sent to the door modules, the remote anti-theft module illuminates a ready-to-arm indicator light in step 22 to inform the vehicle operator that the anti-theft system is attempting to arm (i.e., it enters a pre-arm state).

A check is made in step 23 to determine whether the door position sensors indicate that all doors are closed, which would allow perimeter protection to be initiated. If door-closed signals are received from all door position sensors, then a check is made in step 24 to determine whether a second lock code was transmitted within the predetermined period of time. If the second lock code was received within five seconds, then the vehicle horn is chirped once (and/or the lights are flashed once) in step 25, otherwise step 26 is executed. If the second lock command was not received within five seconds, then the horn chirp (and/or light flash) of step 25 is bypassed.

In step 26, an exit delay of a predetermined time, such as thirty seconds, is established to allow opening and closing of a door without triggering an alarm siren. Thus, the exit delay in step 26 allows time for a person to leave the vehicle or to retrieve an item after having exited the vehicle without disturbing the anti-theft system. After the exit delay, the anti-theft system becomes fully armed in step 27 and the method is completed and exited in step 28.

If a door is not closed after the doors have been locked from the remote fob ("fob" refers to a keychain transmitter), either because a door is ajar or a door position sensor is faulty, then perimeter protection is not possible. Thus, in step 23, if it is determined that door-closed signals have not been received from all door position sensors, a check is made in step 30 to determine whether a second lock code was received within five seconds. If it was, then a double horn chirp (and/or a double light flash) is produced in step 31 by appropriate energizing signals from the anti-theft module to the horn to inform the vehicle operator that arming of the anti-theft system is not possible. If the second lock code was not received within five seconds, the double horn chirp (and/or double light flash) is bypassed.

In step 32, a check is made to determine if all the doors have become closed since the last check of the door position sensors. If they are not closed, then a check is made in step 33 to determine whether a predetermined time, such as thirty minutes, has elapsed since the reception of the lock code from the remote fob. If not, then the door position sensors are again checked in step 32. If it is determined in step 33 that all doors have now been closed, then the exit delay is initiated in step 26 followed by fully arming the anti-theft system in step 27. If 30 minutes elapses without the closing of all the doors, then the pre-armed state is cancelled (i.e., the ready-to-arm light is extinguished) in step 34 and the method is exited in step 35.

In summary, the present invention has provided for on-demand remote controlled verification of the operation of an anti-theft system. Different audible sound outputs, such as horn chirps, or different light flashes, identify the state of the anti-theft system. In particular, one chirp sequence or light flash sequence identifies a locked and arming vehicle while another chirp sequence or light flash sequence indicates the inability to arm the anti-theft system. The user is provided with a convenient method for indicating whether confirmation is desired at the time of initiating the arming sequence, thereby allowing the user to obtain the verification in a proper environment but avoiding the verification in environments where the disturbance inherent in the verification is not desired. If verification is desired more than five seconds after having issued the first lock code, the user is able to transmit a new pair of lock codes within five seconds of each other, so that the lock, arming, and verification sequence of FIG. 2 will be repeated.

What is claimed is:

1. A remote controlled anti-theft system for a transportation vehicle providing on-demand audible verification of anti-theft system operation, comprising:

a portable transmitter transmitting a lock code in response to a manual activation;

door lock actuators for locking doors of said transportation vehicle in response to a lock command signal;

door position sensors associated with said doors, each generating a respective door-closed signal when a respective one of said doors is closed;

a sound transducer producing an audible sound output in response to an energizing signal; and a vehicle-mounted control module responsive to a first occurrence of said lock code to 1) generate said lock command signal which is sent to said door lock actuators and 2) enter an armed state of said anti-theft system if each of said door position sensors produces a door-closed signal, said control module further being responsive to a second occurrence of said lock code received within a predetermined time of said first occurrence of said lock code to generate a first energizing signal to produce a first audible sound output verifying that said armed state has been entered if said lock command has been sent and each of said door position sensors produces a door-closed signal or to generate a second energizing signal to produce a second audible sound output verifying that said armed state has not been entered if at least one of said door position sensors fails to produce a door-closed signal, said control module not producing any energizing signal absent said second occurrence of said lock code regardless of whether said armed state has been entered.

2. The system of claim 1 wherein said first audible output is comprised of a single sound chirp.

3. The system of claim 1 wherein said second audible output is comprised of a double sound chirp.

4. A method of operating a remote controlled anti-theft system for a transportation vehicle comprising the steps of:

transmitting a first occurrence of a lock code from a portable transmitter;

locking at least one door of said transportation vehicle in response to said first occurrence of said lock code;

sensing the open/closed position of said door;

entering an armed state of said anti-theft system in response to said first occurrence of said lock code if said door is sensed to be in a closed position;

if a second occurrence of said lock code is transmitted within a predetermined time of said first occurrence of said lock code, then either 1) producing a first audible sound output to verify if said armed state has been entered, or 2) producing a second audible sound output to verify if said armed state has not been entered; and withholding any production of an audible sound output absent said second occurrence of said lock code, whereby no verification is produced concerning said armed or unarmed state of said anti-theft system.

* * * * *